US008614835B2

(12) United States Patent
Ishii

(10) Patent No.: US 8,614,835 B2
(45) Date of Patent: Dec. 24, 2013

(54) IMAGE PROCESSING APPARATUS, IMAGE PROCESSING METHOD, AND COMPUTER PROGRAM PRODUCT

(75) Inventor: Masaki Ishii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 596 days.

(21) Appl. No.: 12/707,164

(22) Filed: Feb. 17, 2010

(65) Prior Publication Data

US 2010/0238514 A1    Sep. 23, 2010

(30) Foreign Application Priority Data

Mar. 18, 2009 (JP) ................................. 2009-067105
Jan. 13, 2010 (JP) ................................. 2010-004857

(51) Int. Cl.
*H04N 1/40* (2006.01)
*G06K 15/00* (2006.01)

(52) U.S. Cl.
USPC ......... 358/3.28; 358/1.9; 358/3.21; 358/3.24; 358/1.18; 382/100

(58) Field of Classification Search
USPC ....................................................... 358/3.28
See application file for complete search history.

(56) References Cited

U.S. PATENT DOCUMENTS

| | | | |
|---|---|---|---|
| 6,661,933 B1 * | 12/2003 | Hisatomi et al. | 382/306 |
| 6,700,994 B2 * | 3/2004 | Maes et al. | 382/100 |
| 7,227,661 B2 * | 6/2007 | Matsunoshita | 358/1.15 |
| 7,447,329 B2 | 11/2008 | Choi et al. | |
| 7,684,637 B2 * | 3/2010 | Ishikawa et al. | 382/270 |
| 7,706,026 B2 | 4/2010 | Ishii | |
| 7,900,838 B2 * | 3/2011 | Hamada et al. | 235/462.09 |
| 2005/0152006 A1 * | 7/2005 | Abe et al. | 358/3.28 |
| 2005/0171914 A1 * | 8/2005 | Saitoh | 705/51 |

FOREIGN PATENT DOCUMENTS

| | | |
|---|---|---|
| CN | 1452116 A | 10/2003 |
| CN | 1829311 A | 9/2006 |
| JP | 2005-72777 | 3/2005 |
| JP | 2007-5935 | 1/2007 |
| JP | 3964684 | 6/2007 |

OTHER PUBLICATIONS

Chinese Office Action issued Aug. 25, 2011, in Patent Application No. 201010136405.X (with English Translation).

* cited by examiner

*Primary Examiner* — Richard Zhu
(74) *Attorney, Agent, or Firm* — Oblon, Spivak, McClelland, Maier & Neustadt, L.L.P.

(57) ABSTRACT

An image processing apparatus includes an image acquiring unit that acquires image data, an additional-data generating unit that generates additional data, a first-code-image generating unit that generates first-code image data, a first-superimposed-image producing unit that combines the first-code image data with the image data, thereby producing first-superimposed image data, a detecting-data generating unit that generates data for use in detecting modification made to the first-superimposed image data, a second-code-image generating unit that generates second-code image data, and a second-superimposed-image producing unit that produces second-superimposed image data by clipping a portion of the second-code image data, the portion corresponding to an image area of the first-superimposed image data where the first-code image data is provided, and combining the first-superimposed image data with the second-code image data from which the portion has been clipped.

16 Claims, 10 Drawing Sheets

DOT PATTERN REPRESENTING BIT 0

DOT PATTERN REPRESENTING BIT 1

SECOND CODE IMAGE

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-067105 filed in Japan on Mar. 18, 2009 and Japanese Patent Application No. 2010-004857 filed in Japan on Jan. 13, 2010.

BACKGROUND OF THE INVENTION

1. Field of the Invention

The present invention relates generally to a technique for image processing that allows detection of modification.

2. Description of the Related Art

Conventionally, techniques with use of special paper or ink have been employed to prevent unauthorized copying or forgery. Developments in printing technology and information and communications technology have allowed easy creation and distribution of documents in recent years. Under such a circumstance, it is typical to produce a printout with a general printer on ordinary paper, while it is less often to perform printing on special paper or with special ink. However, with increasing information security awareness, demands for a technique for preventing leakage of information from and data modification to a document printed on ordinary paper with such a general printer are growing. Not only a technique for detecting modification made to digital data but also a technique for detecting modification made to a printed document has been demanded. Under such circumstances, techniques for preventing modification made to a document printed on ordinary paper have been proposed.

In view of the above circumstances, techniques have been devised. According to, for instance, a technique disclosed in Japanese Patent Application Laid-open No. 2007-5935 or Japanese Patent No. 3964684, second-code image data, which is data for use in detecting modification, is combined with a document image so that modification made to a printed document can be detected. According to another technique disclosed in, for instance, Japanese Patent Application Laid-open No. 2005-72777, two types of image data, or, specifically, background dot patterns and first-code image data, which is additional data, are combined with a document image.

However, the technique disclosed in Japanese Patent Application Laid-open No. 2007-5935 or Japanese Patent No. 3964684 is disadvantageous in that although the second-code image data, which is the data for use in detecting modification, is combined with the document image, the first-code image data serving as the additional data is not combined with the document image.

The technique disclosed in Japanese Patent Application Laid-open No. 2005-72777 is disadvantageous in that although the two types of image data, which are the background dot patterns and the first-code image data serving as the additional data, are combined with the document image, the background dot patterns are not the second-code image data; therefore, modification made to the document image remains undetectable.

SUMMARY OF THE INVENTION

It is an object of the present invention to at least partially solve the problems in the conventional technology.

According to an aspect of the present invention, there is provided an image processing apparatus includes an image acquiring unit that acquires image data to be processed; an additional-data generating unit that generates additional data to be embedded in the image data; a first-code-image generating unit that generates, from the additional data, first-code image data that is machine readable; a first-superimposed-image producing unit that produces first-superimposed image data by combining the first-code image data with the image data; a detecting-data generating unit that generates detecting data for use in detecting modification made to the first-superimposed image data; a second-code-image generating unit that generates, from the detecting data, second-code image data that is machine readable; and a second-superimposed-image producing unit that produces second-superimposed image data by clipping a portion of the second-code image data, the portion corresponding to an image area of the first-superimposed image data where the first-code image data is provided, and combining the first-superimposed image data with the second-code image data from which the portion has been clipped.

According to another aspect of the present invention, there is provided an image processing method includes acquiring image data to be processed; generating additional data to be embedded in the image data; generating, from the additional data, first-code image data that is machine readable; producing first-superimposed image data by combining the first-code image data with the image data; generating detecting data for use in detecting modification made to the first-superimposed image data; generating, from the detecting data, second-code image data that is machine readable; and producing second-superimposed image data by clipping a portion of the second-code image data, the portion corresponding to an image area of the first-superimposed image data where the first-code image data is provided, and combining the first-superimposed image data with the second-code image data from which the portion has been clipped.

According to still another aspect of the present invention, there is provided a computer program product including a computer-usable medium having computer-readable program codes embodied in the medium for processing image. The program codes when executed causes a computer to execute the method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
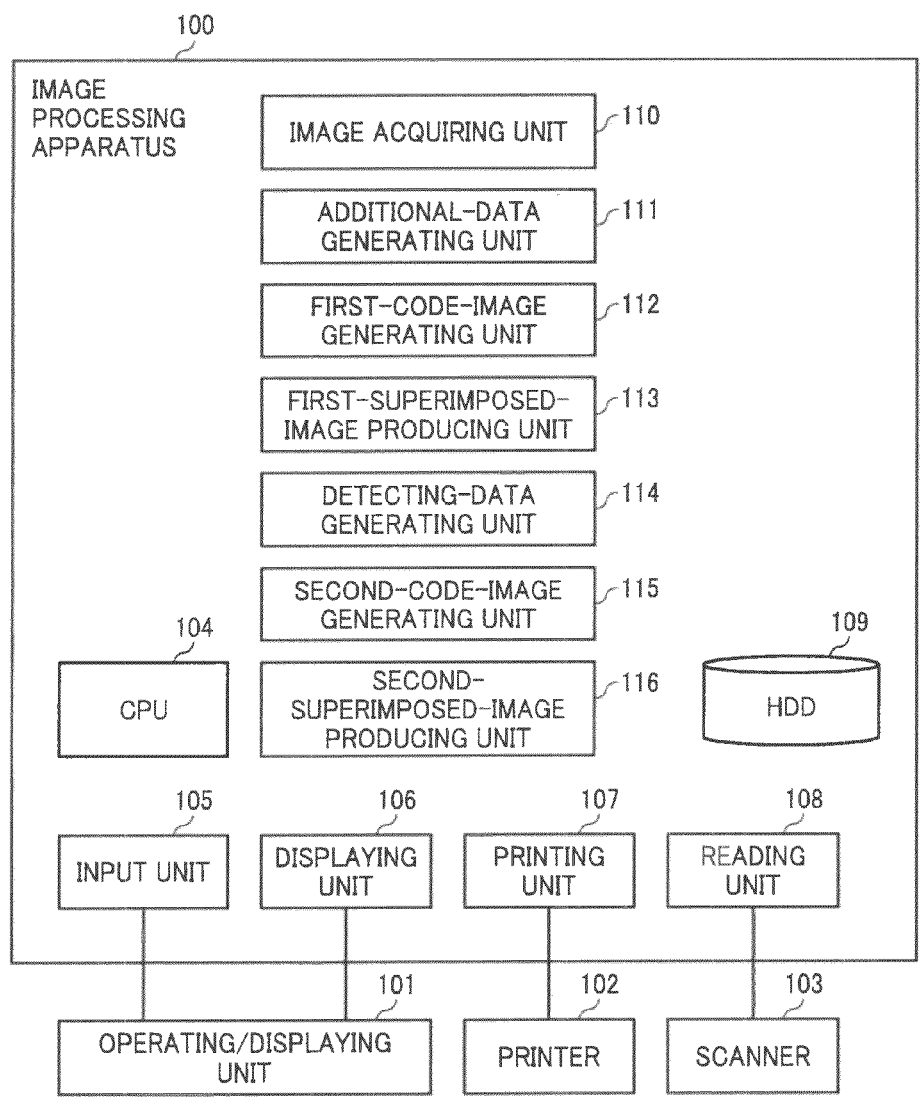
FIG. 1 is a block diagram of an image processing apparatus according to an embodiment of the present invention.

FIG. 1 is a block diagram of an image processing apparatus according to an embodiment of the present invention. An image processing apparatus 100 transmits and receives image data to and from an operating/displaying unit 101, a printer 102, and a scanner 103.

The operating/displaying unit 101 displays a document image and receives a control input entered by a user. The printer 102 performs, upon receiving an instruction to perform printing, a series of operations that start from sheet feeding and end by image forming. The scanner 103 optically scans in a document to obtain image data.

The image processing apparatus 100 includes an image acquiring unit 110 serving as image acquiring means, an additional-data generating unit 111 serving as additional-data generating means, a first-code-image generating unit 112 serving as first-code-image generating means, a first-superimposed-image producing unit 113 serving as first-superimposed-image producing means, a detecting-data generating unit 114 serving as detecting-data generating means, a second-code-image generating unit 115 serving as second-code-image generating means, a second-superimposed-image producing unit 116 serving as second-superimposed-image producing means, a central processing unit (CPU) 104, a hard disk drive (HDD) 109, an input unit 105, a displaying unit 106, a printing unit 107 serving as printing means, and a reading unit 108.

The reading unit 108 transmits image data scanned in the scanner 103 to the image acquiring unit 110. The input unit 105 receives a control input entered by a user from the operating/displaying unit 101. The displaying unit 106 performs processes for displaying a document image on the operating/displaying unit 101.

The image acquiring unit 110 acquires a to-be-processed image, corresponding to image data, from the reading unit 108.

The additional-data generating unit 111 generates additional data for use in embedding a bar-code in the image. Specific examples of the additional data include an image identification (ID) for use in associating the to-be-processed image with a sheet of paper, or a printed document, on which the second superimposed image is printed as described in embodiments of Japanese Patent Application Laid-open No. 2005-72777. The additional data is not necessarily generated by the image processing apparatus; alternatively, for instance, information entered by a user, such as a user ID, or a timestamp acquired by way of a network can be adopted as the additional data.

The first-code-image generating unit 112 generates a bar-code, which is a first code image, by encoding the additional data.

The first-superimposed-image producing unit 113 combines the bar-code, which is the first code image, with the to-be-processed image, thereby producing a first superimposed image. Combining position data, which indicates a position where the first code image is to be combined, is acquired from, for instance, the HDD 109 when the combining position data is stored in the HDD 109 arranged in the image processing apparatus.

Figure 2:
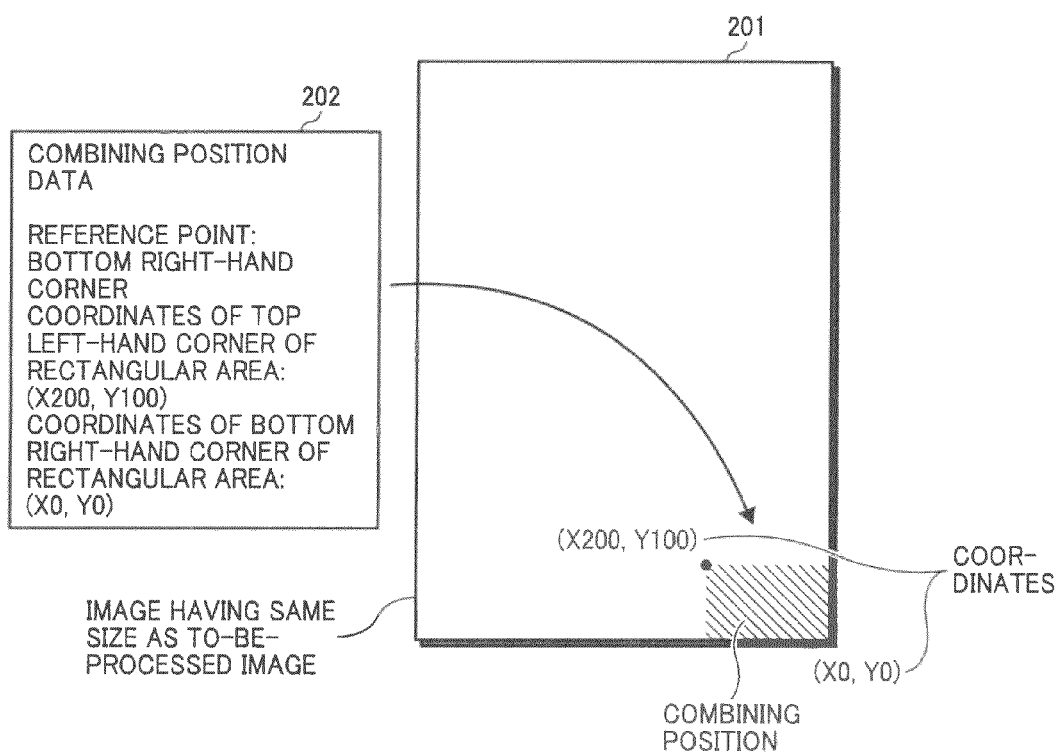
FIG. 2 is a schematic explanatory diagram illustrating an example of combining position data pertaining to a first code image.

FIG. 2 is a schematic explanatory diagram illustrating an example of combining position data pertaining to the first code image. In FIG. 2, the reference numeral 201 denotes an image having the same size as the to-be-processed image, and 202 denotes the combining position data. The combining position data 202 includes a reference point (in this example, coordinates (X0, Y0)) and a combining position (in this example, coordinates (X200, Y200)) on the image 201. In this example, the reference point is set to the bottom right-hand corner; and the combining position is defined by coordinates of the top left-hand corner and coordinates of the bottom right-hand corner of a rectangular area.

Figure 3:
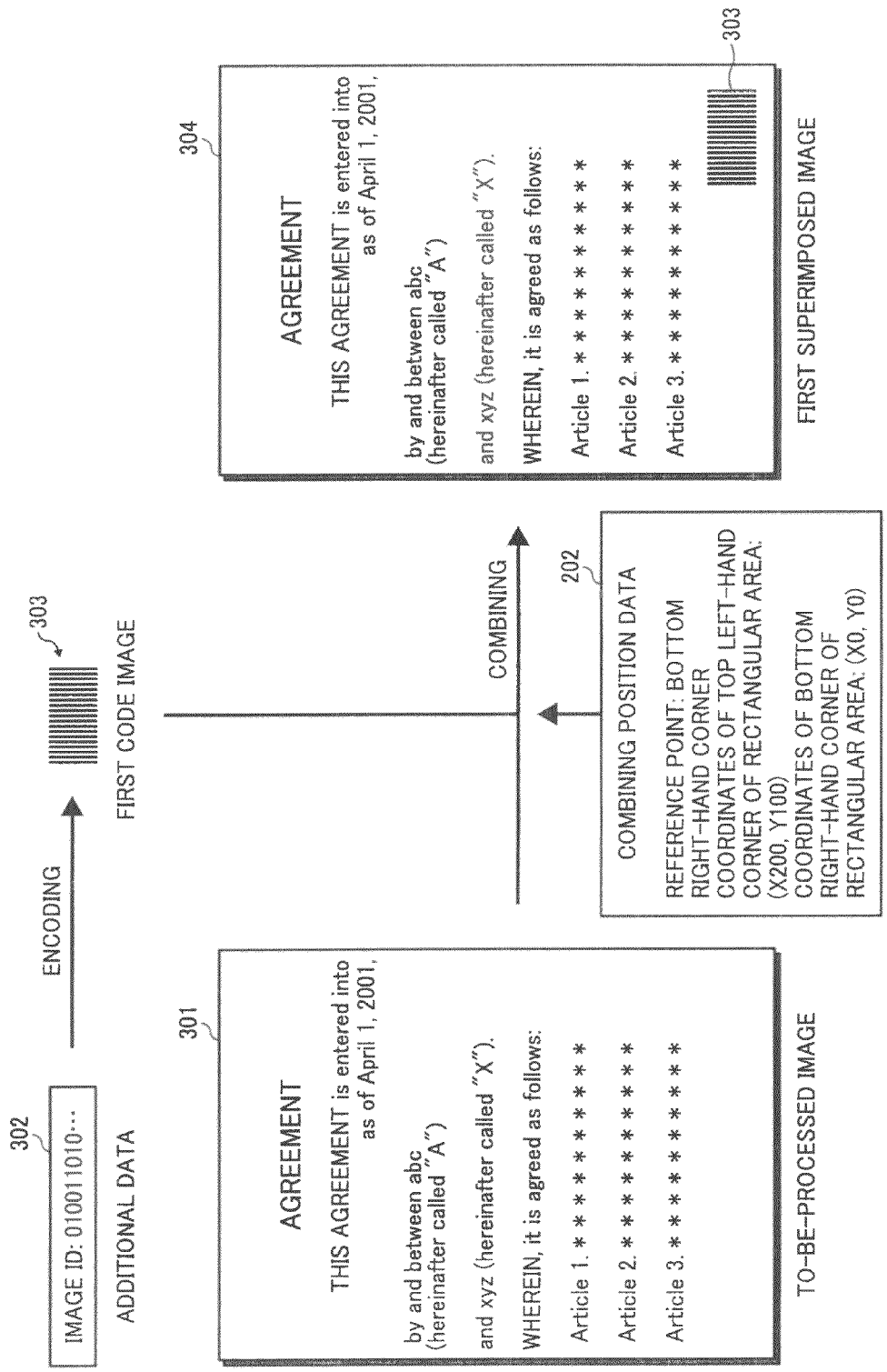
FIG. 3 is a schematic explanatory diagram illustrating an example of combining a first code image to produce a first superimposed image.

FIG. 3 is a schematic explanatory diagram illustrating an example of producing a first superimposed image by combining a first code image with a to-be-processed image. In FIG. 3, reference numeral 301 denotes the to-be-processed image, 302 denotes the additional data, 303 denotes the first code image, and 304 denotes the first superimposed image. The first superimposed image 304 is produced by combining a bar-code (the first code image 303) generated by the first-code-image generating unit 112 with the to-be-processed image 301 with reference to the combining position data 202. Meanwhile, the bar-code can be a typical one-dimensional bar-code, or, alternatively, in a case where an amount of the additional data is large, a two-dimensional bar-code, such as a quick response (QR) code.

The detecting-data generating unit 114 generates data for use in detecting modification made to the first superimposed image 304. More specifically, as described in Japanese Patent Application Laid-open No. 2007-5935 discussed earlier, data obtained by performing color reduction, gray-scale transformation, resolution conversion, image compression, or the like on the first superimposed image 304 can be used as the detecting data.

The second-code-image generating unit 115 generates a background dot-pattern image (a second code image 404) by encoding the detecting data. The detecting data is, more specifically, dot patterns representing bit 0 (see reference numeral 401 in FIG. 4) and bit 1 (see reference numeral 402 in FIG. 4). The dot patterns are arranged from the top left-hand corner to the bottom right-hand corner of the image in an order of raster scanning. Note that the second code image 404 is generated so as to have the same size as the first superimposed image 304.

Figure 4:
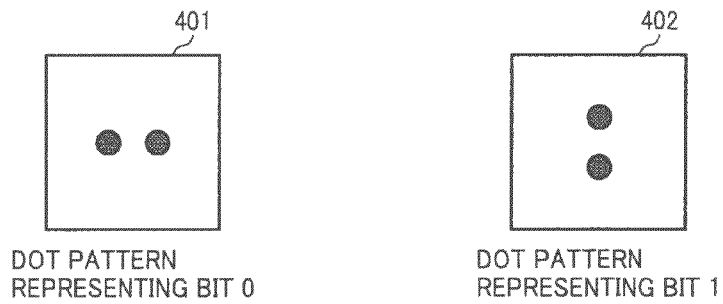
FIG. 4 is a schematic explanatory diagram illustrating an example set of dot patterns representing bit 0 and bit 1.
Figure 5:
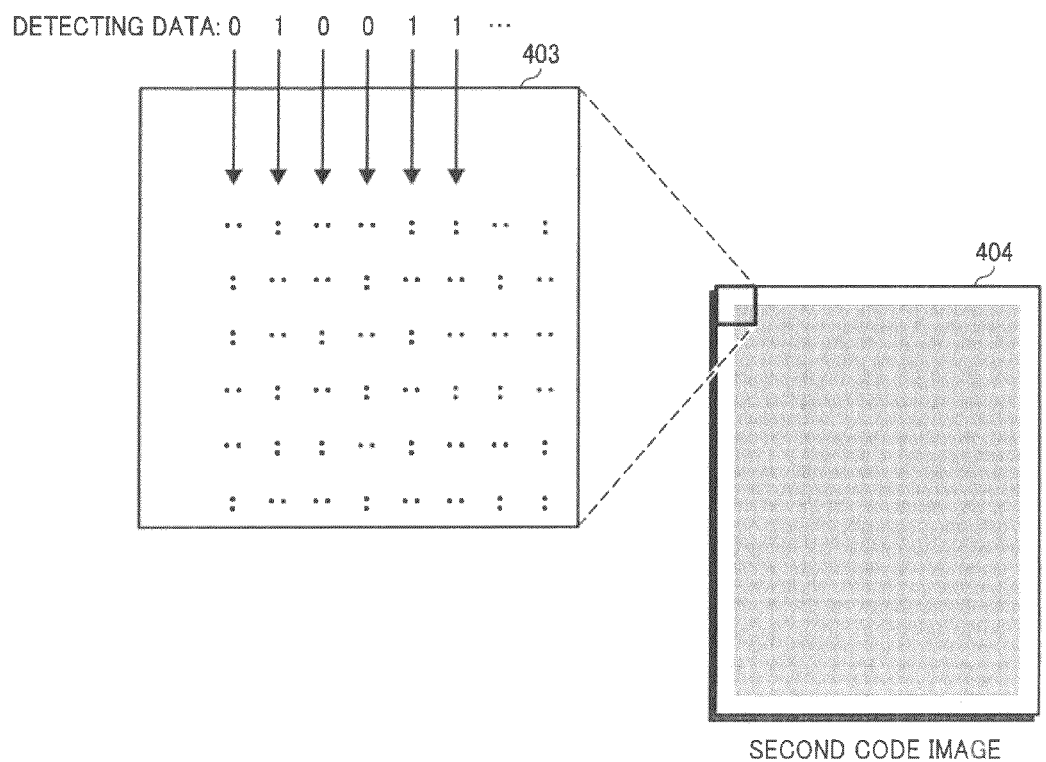
FIG. 5 is a schematic explanatory diagram illustrating an example of generating a second code image by arranging dot patterns on an image.

FIG. 4 is a schematic explanatory diagram illustrating an example set of the dot patterns representing bit 0 and bit 1 for use in the detecting data. FIG. 5 is a schematic explanatory diagram illustrating an example of generating the second code image 404 by arranging such dot patterns as those illustrated in FIG. 4 on an image. In FIG. 5, reference numeral 403 denotes the detecting data, and 404 denotes the second code image.

The second-superimposed-image producing unit 116 combines the second code image 404 with the first superimposed image 304. When performing this combining, the second-superimposed-image producing unit 116 refers to the combining position data 202, which is the position where the first code image 303 is to be combined, stored in the HDD 109.

Figure 6:
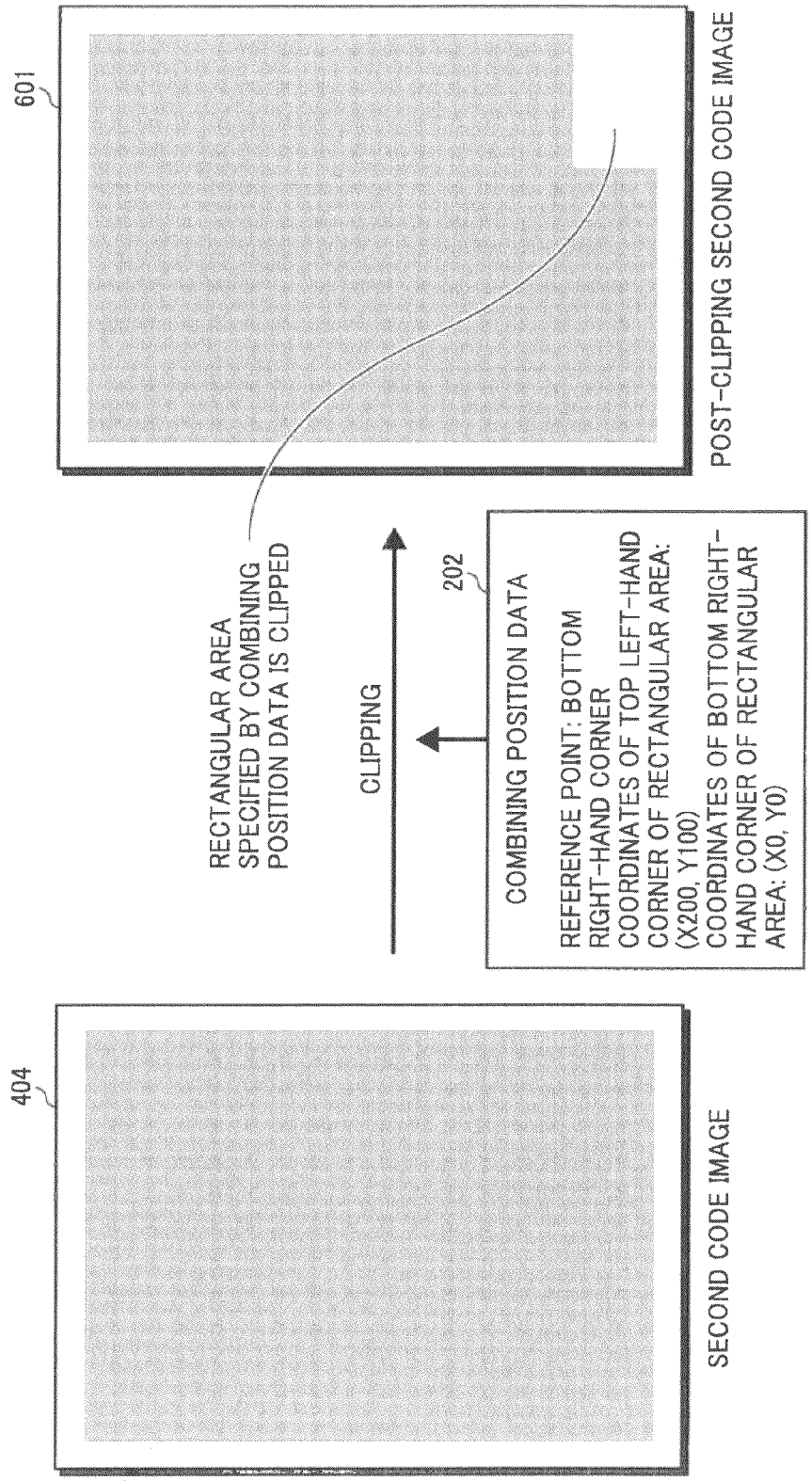
FIG. 6 is a schematic explanatory diagram illustrating an example of clipping an area specified by combining position data from the second code image.

The second-superimposed-image producing unit 116 clips an area specified by the combining position data 202 from the second code image 404, as shown in FIG. 6. Reference numeral 601 denotes a post-clipping second code image, which is the second code image from which the area has been clipped. The area to be clipped from the second code image 404 is desirably within an extent where the detecting data is restorable. A percentage of the area to be clipped from the second code image 404 in the second code image 404 is expressed as D %. Dmax %, which is a maximum value of D that allows restoration of the detecting data based on the second code image 404, from which an area of D % has been clipped, is stored in the HDD 109 in advance.

When an area has been clipped from the second code image 404, the second-superimposed-image producing unit 116 calculates Da, which is a percentage of the area relative to the second code image 404. Thereafter, whether Da is greater than Dmax is determined. When Da is determined to be greater than Dmax, the detecting data 403 cannot be restored based on the second code image 404; therefore, the process ends. FIG. 6 is a schematic explanatory diagram illustrating an example of clipping an area specified by the combining position data 202 from the second code image 404.

Figure 7:
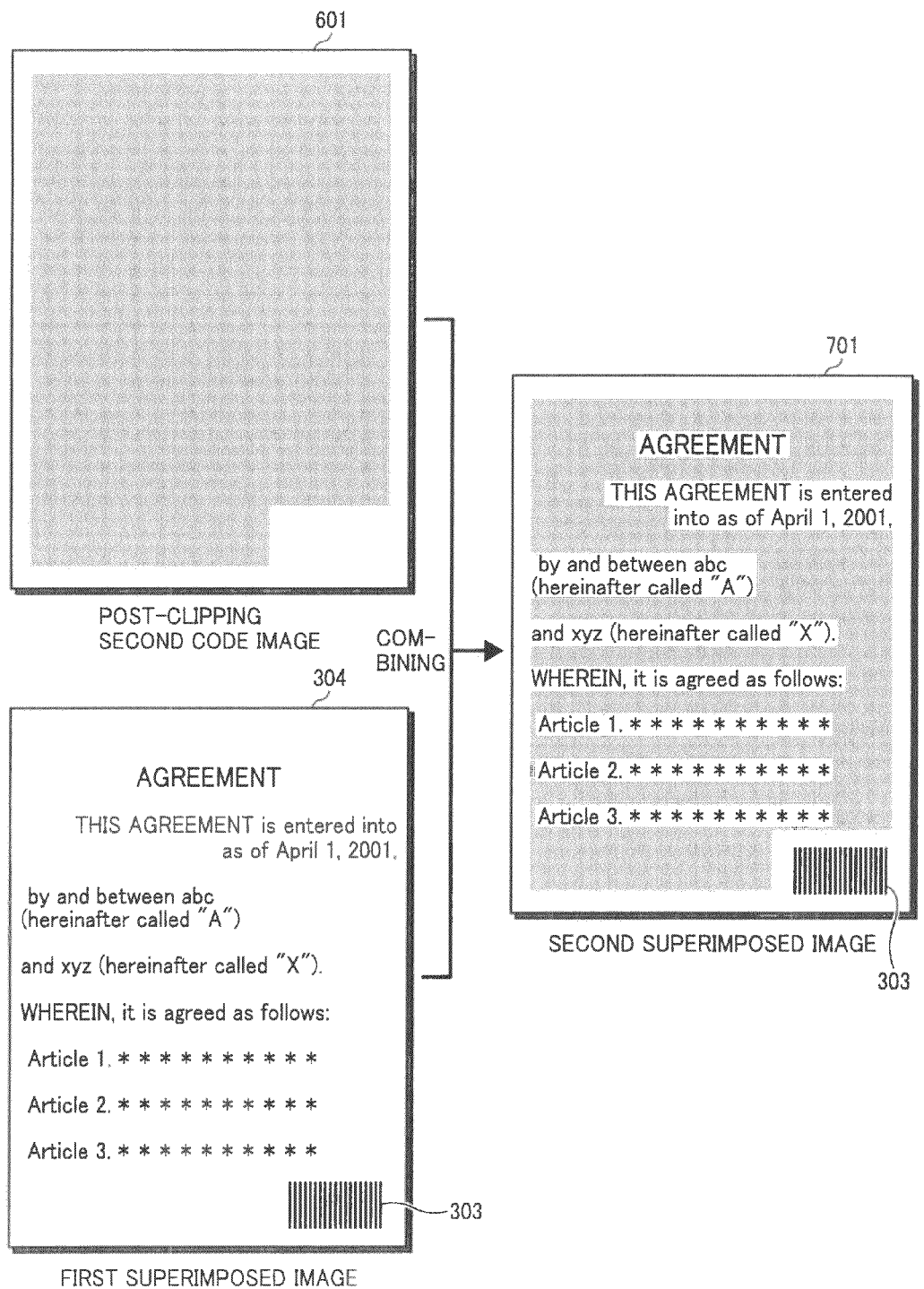
FIG. 7 is a schematic explanatory diagram illustrating an example of producing a second superimposed image.

The second-superimposed-image producing unit 116 combines the post-clipping second code image 601, which is the image having been subjected to clipping of the area indicated by the combining position data 202, with the first superimposed image 304 to produce a second superimposed image 701. FIG. 7 is a schematic explanatory diagram illustrating an example of producing the second superimposed image 701.

The printing unit 107 receives the second superimposed image 701 produced through the procedure discussed above and produces a printout of the second superimposed image 701 on paper through predetermined processes.

Figure 8:
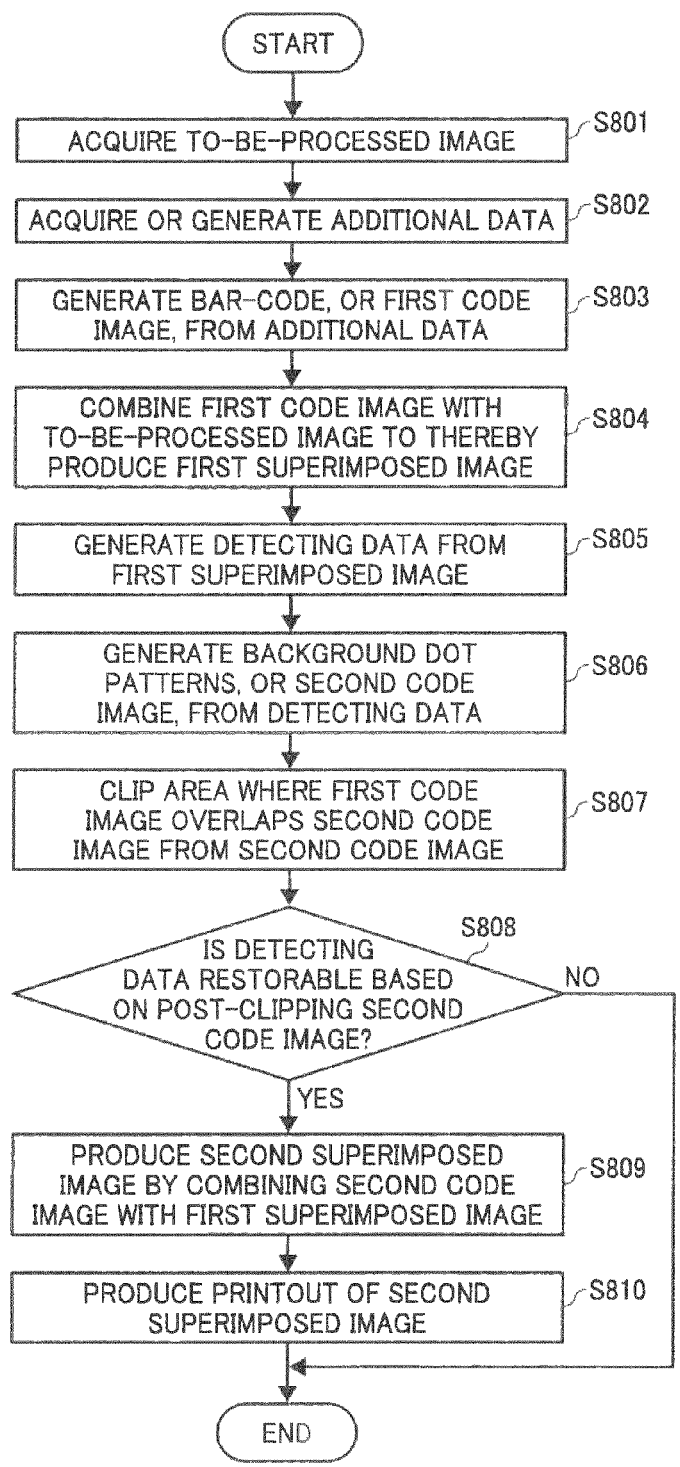
FIG. 8 is a flowchart of a process procedure, to be performed by the image processing apparatus, that starts from combining additional data and ends by combining data for use in detecting modification.

A process procedure, to be performed by the image processing apparatus 100 according to the present embodiment configured as discussed above, that starts from combining data represented by a one-dimensional or two-dimensional bar-code, which is additional data, with a document image, and that ends by combining data for use in detecting modification with the document image at an area where the bar-code data is not provided will be described below. FIG. 8 is a flowchart illustrating the process procedure discussed above to be performed by the image processing apparatus 100 according to the present embodiment. In this flowchart, reference numerals used in FIG. 1 to FIG. 7 discussed above are incorporated as appropriate.

The image acquiring unit 110 acquires the to-be-processed image 301 (Step S801).

The additional-data generating unit 111 acquires or generates the additional data 302 (Step S802).

The first-code-image generating unit 112 generates a bar-code, which is the first code image 303, from the additional data 302 (Step S803).

The first-superimposed-image producing unit 113 combines the first code image 303 with the to-be-processed image 301, thereby producing the first superimposed image 304 (Step S804).

The detecting-data generating unit 114 generates the detecting data 403 from the first superimposed image 304 (Step S805).

The second-code-image generating unit 115 generates background dot patterns, corresponding to the second code image 404, from the detecting data 403 (Step S806).

The second-superimposed-image producing unit 116 clips an area where the first code image 303 overlaps the second code image 404 from the second code image 404 (Step S807).

The second-superimposed-image producing unit 116 determines whether the detecting data is restorable based on the post-clipping second code image 601 (Step S808). If the second-superimposed-image producing unit 116 determines that the detecting data is not restorable based on the post-clipping second code image 601 (No at Step S808), the process ends.

If the second-superimposed-image producing unit 116 determines that the detecting data 403 is restorable based on the post-clipping second code image 601 (Yes at Step S808), the second-superimposed-image producing unit 116 combines the second code image 404 with the first superimposed image 304, thereby producing the second superimposed image 701 (Step S809).

The printing unit 107 transmits the second superimposed image 701 produced by the second-superimposed-image producing unit 116 to the printer 102 so that the second superimposed image 701 is printed on paper (Step S810).

As discussed above, according to the present embodiment, data represented by a one-dimensional or two-dimensional bar-code, which is additional data, is combined with a document image, and further data for use in detecting modification is combined with the document image at an area where the bar-code data is not provided. This leads to provision of a document image that allows detection of modification made to its data as well as utilization of additional data.

Figure 9:
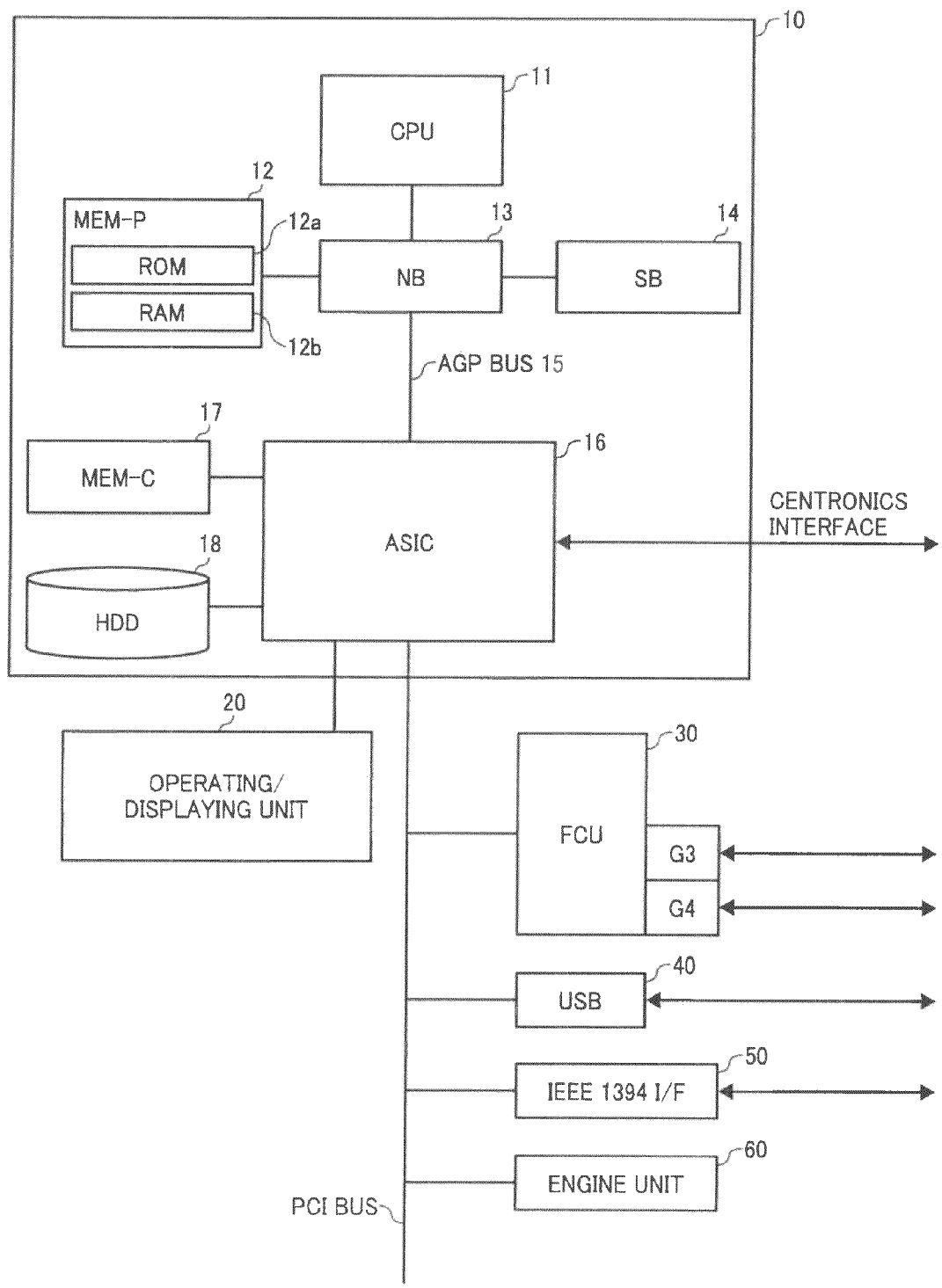
FIG. 9 is a block diagram illustrating a hardware configuration of a multifunctional product capable of functioning as the image processing apparatus illustrated in FIG. 1.

FIG. 9 is a block diagram illustrating an example hardware configuration of a multifunctional product (MFP) capable of functioning as the image processing apparatus illustrated in FIG. 1. As illustrated in FIG. 9, the MFP includes a controller 10 and an engine unit 60 that are connected together with a peripheral component interface (PCI) bus. The controller 10 is a controller that controls the overall MFP, picture processing, communications, and inputs entered from an operating unit (not shown). The engine unit 60 is a printer engine or the like that is connectable to the PCI bus. Examples of the engine unit 60 include a monochrome plotter, a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 10 includes a CPU 11, a north bridge (NB) 13, a system memory (hereinafter, "MEM-P") 12, a south bridge (SB) 14, a local memory (hereinafter, "MEM-C") 17, an application-specific integrated circuit (ASIC) 16 that is connected to the NB 13 through an accelerated graphics port (AGP) bus 15, and an HDD 18. The MEM-P 12 includes a read only memory (ROM) 12a and a random access memory (RAM) 12b.

The CPU 11 that controls the overall MFP includes a chip set that includes the NB 13, the MEM-P 12, and the SB 14, and is connected to other devices via the chip set.

The NB 13 is a bridge for connecting the CPU 11 to the MEM-P 12, the SB 14, and the AGP bus 15, and includes a PCI master, an AGP target, and a memory controller that controls reading and writing from and to the MEM-P 12 and the like.

The MEM-P 12 is a system memory for use as a memory for storing therein computer programs and data, a memory for expanding computer programs and data therein, a memory for use in picture processing performed by the printer, and the like, and includes the ROM 12a and the RAM 12b. The ROM 12a is a read only memory for use as a memory for storing therein computer programs and data. The RAM 12b is a writable and readable memory for use as a memory for expanding computer programs and data therein, a memory for use in picture processing performed by the printer, and the like.

The SB 14 is a bridge for connecting the NB 13 to PCI devices and to peripheral devices. The SB 14 is connected to the NB 13 via the PCI bus, to which a network interface (I/F) unit and the like are also connected.

The ASIC 16 is an integrated circuit (IC) for use in image processing, includes a hardware component for the image processing, and functions as a bridge that connects the AGP bus 15, the PCI bus, the HDD 18, and the MEM-C 17 with each other. The ASIC 16 includes a PCI target and an AGP master, an arbiter (ARB) serving as the core for the ASIC 16, a memory controller that controls the MEM-C 17, a plurality of direct memory access controllers (DMACs) that control rotation of image data and the like by hardware logic, and a PCI unit that performs data transfer to and from the engine unit 60 via the PCI bus. A facsimile control unit (FCU) 30, a universal serial bus (USB) 40, and an IEEE 1394 (the Institute of Electrical and Electronics Engineers 1394) interface 50 are connected to the ASIC 16 via the PCI bus. An operating/displaying unit 20 is directly connected to the ASIC 16.

The MEM-C 17 is a local memory for use as a copy image buffer and a code buffer; the HDD 18 is a storage for storing therein image data, computer programs, font data, and forms.

The AGP bus 15 is a bus interface for a graphics accelerator card introduced to speed up graphics operations and allows direct access to the MEM-P 12 with a high throughput, thereby speeding up operations related to the graphic accelerator card.

Image processing computer program to be executed by the image processing apparatus according to the present embodiment can be provided as being preinstalled in a ROM or the like.

The image processing computer program to be executed by the image processing apparatus according to the present embodiment can be provided as being recorded in a computer-readable recording medium, such as a compact disc-read-only memory (CD-ROM), a flexible disk (FD), a CD recordable (CD-R), or a digital versatile disk (DVD), in an installable or executable format.

The embodiment has been discussed by way of example where the image processing apparatus according to the invention is implemented into an MFP that provides at least two of a copying function, a printer function, a scanner function, and a facsimile function; however, the image processing apparatus can be implemented into any image processing apparatus, such as an MFP, a printer, a scanner, or a facsimile machine.

Further effect and modifications can be readily derived by persons skilled in the art. The present invention is not limited by the specific embodiment described above.

Figure 10:
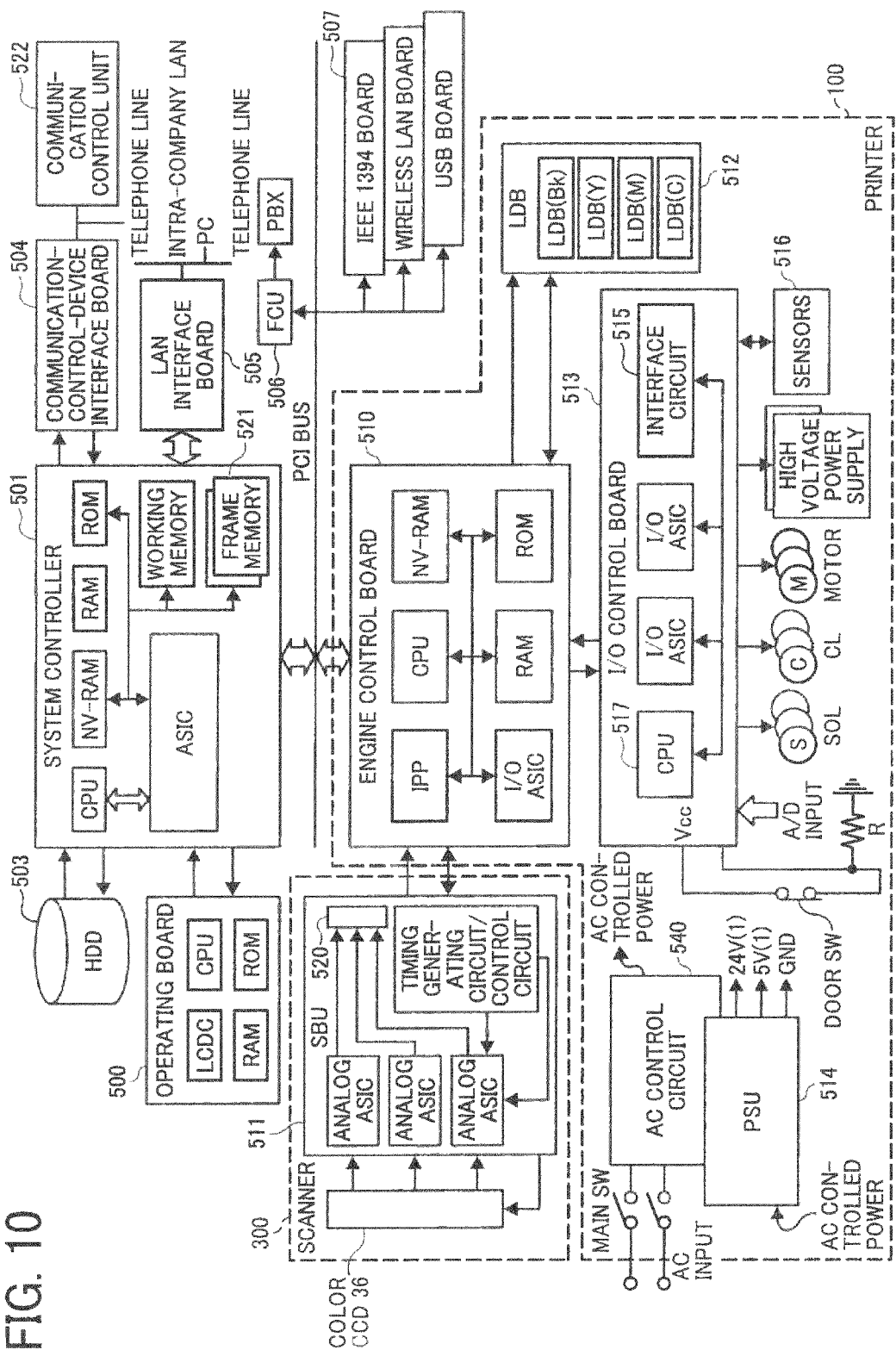
FIG. 10 is a block diagram illustrating another hardware configuration of a multifunctional product capable of functioning as the image processing apparatus illustrated in FIG. 1.

FIG. 10 is a block diagram illustrating an example electrical system configuration of an MFP capable of functioning as the image processing apparatus illustrated in FIG. 1. The electrical system includes a system controller 501 that performs overall control of an image forming apparatus, an operating board 500 of the image forming apparatus connected to the controller 501, an HDD 503 that stores therein image data, a communication-control-device interface board 504 that carries out external communications via an analog communications line, an FCU 506 connected to a general-purpose PCI bus, boards 507 that include an IEEE 1394 board, a local area network (LAN) interface board 505, and a USB board and are connected to the PCI bus, an engine control board 510 connected to the controller via the PCI bus, an input/output (I/O) control board 513 that is connected to the engine control board 510 and controls inputs and outputs to and from the image forming apparatus, a scanner board (sensor board unit) (SBU) 511 for use in reading a document (image), and a laser diode board (LDB) 512 that emits (performs optical writing with) laser beams according to image data to a photosensitive drums. When a malfunction occurs with the apparatus, the communication-control-device interface board 504 immediately sends a notification to an external remote diagnosis apparatus so that a service person can locate and assesses the malfunction and repair the apparatus quickly. In addition to this, the communication-control-device interface board 504 is used to transmit usage state of the apparatus and the like.

A scanner 300 that optically reads a document scans a document with a document illuminating light source and forms a document image on a charge coupled device (CCD) 36. The CCD 36 performs photoelectric conversion of the document image, or, more specifically, light reflected from the document, to thereby generate red (R), green (G), and blue (B) image signals. The CCD 36 is a three-line color CCD that generates the R, G and B image signals for even-pixel channels (EVENch)/odd-pixel channels (ODDch) and inputs the image signals to an analog ASIC of the SBU. The SBU 511 includes analog ASICs and a timing circuit that generates timing signals for driving the CCD and the analog ASICs. An output of the CCD 36 is subjected to sampling and holding performed by a sample-and-hold circuit in the analog ASIC and thereafter subjected to analog-to-digital (A/D) conversion to be converted into R, G, and B image data. After being subjected to shading correction, the image data is transmitted to an image data processing processor (IPP) via an output I/F 520 through an image data bus.

The IPP is a programmable arithmetic processing unit that performs image processing, such as image area separation (determination as to whether each area of an image is a character area or a picture area), background noise erasure, gamma conversion for the scanner, filter processing, color correction, scaling, image modification, gamma correction for the printer, and gray-scale processing. The IPP performs the series of operations related to modification made to a document discussed above. The image data transferred to the IPP from the SBU 511 is subjected to correction, performed by the IPP, of signal degradation (signal degradation due to or related to the scanner) that can occur due to an optical system or digitization, and then written in a frame memory 521.

The system controller 501 includes a CPU, a ROM for use in controlling a system controller board, a RAM to be used by the CPU as a working memory, a nonvolatile (NV)-RAM that includes a built-in lithium battery, data for backup to the RAM, and a clock, an ASIC that performs system bus control for the system controller board, frame memory control, and control operations related to the CPU, such as first-in, first-out (FIFO) control, and interface circuit of the ASIC.

The system controller 501 has functions of a plurality of applications, such as a scanner application, a facsimile application, a printer application, and a copying application, and controls the overall system. The system controller 501 interprets an input entered from the operating board 500 and displays system settings and states of the system on the operating board 500. A number of units are connected to the PCI bus such that image data and control commands are transferred in a time division manner bus via the image-data bus and a control-command bus.

The communication-control-device interface board 504 is a communications interface board, across which communications between a communication control device and the controller 501 are carried out. Communications with the controller 501 are carried out in a full-duplex asynchronous serial communication mode. The communication-control-device interface board 504 is connected to a communication control unit 522 in a multi-drop configuration in accordance with RS-485 interface standard. Communications with an external remote management apparatus 630 are carried out via the communication-control-device interface board 504.

The LAN interface board 505 is a communications interface board that is connected to an intra-company LAN, provides communications interface between the controller 501 and the intra-company LAN, and includes a physical layer (PHY) chip. The LAN interface board 505 and the controller 501 are connected across a standard communications interface with a PHY chip I/F and an inter-integrated circuit (I2C) bus I/F. Communications with an external device are carried out via the LAN interface board 505.

The HDD 503 is used as an application database that stores therein application computer programs for the system and device-associated information for the printer and image-forming-related devices and as an image database that stores therein image data about a readout image and an image to be written and document data. The HDD 503 is connected to the controller across, in addition to a physical interface and an electrical interface, an ATA/ATAPI-4.

The operating board 500 includes a CPU, a ROM, a RAM, and an ASIC (LCD controller (LCDC)) that controls inputs entered from a liquid crystal display (LCD) and key entry. In the ROM, control computer program for the operating board 500 for controlling input reading from and display output onto the operating board 500 are stored. The RAM is a working memory for use by the CPU. By carrying out communications with the system controller 501, the operating board 500 controls display and input so that a user enters system settings by operating a panel and system settings and status are displayed for the user.

Each of black (Bk), yellow (Y), cyan (C), and magenta (M) writing signals output from the working memory of the system controller 501 is fed to a corresponding one of Bk, Y, M, and C LD writing circuits of an LDB. The writing signal is subjected to LD current control (i.e., modulation control) in the LD writing circuit and fed to a corresponding one of LDs.

The engine control board 510 is a process controller that primarily controls image forming and includes a CPU, an IPP that performs image processing, a ROM that stores therein computer program for use in control of copying and printout production, a RAM for use in the control, and an NV-RAM. The NV-RAM includes a static RAM (SRAM), and a memory for storing data in an electronically erasable programmable ROM (EEPROM) in response to detection of power-off. An I/O ASIC is an ASIC that includes a serial interface, across which signals are to be exchanged with another CPU that perform other control operations, and controls a nearby I/O (a counter, a fan, a solenoid, a motor, or the like), on which the engine control board is mounted. The I/O control board 513 and the engine control board 510 are connected together via a synchronous serial interface.

The I/O control board 513 includes a sub CPU 517 and performs I/O control operations for the image forming apparatus. The control operations include reading and analog control of detection signals output from a temperature sensor, an electric voltage sensor, a density sensor serving as a toner level sensor provided on a photosensitive member, and a photosensor serving as a toner density sensor, jam detection performed by referring to a detection signal output from a sheet sensor, and sheet delivery control. An interface circuit 515 is an interface circuit that provides an interface between the various sensors and actuators (the motor, a clutch, and the solenoid). The photosensor discussed above is one of various sensors 516.

A power source device (PSU) 514 is a unit that supplies electric power for use in controlling the image forming apparatus. By switching on (close) a main switch (SW), commercial electric power source is supplied. A commercial alternating current (AC) is fed from the commercial electric power source to an AC control circuit 540 that performs rectification, smoothing, or the like on the AC and outputs AC controlled power. The PSU 514 supplies various control boards with direct current (DC) voltage as required by using the AC controlled power. CPUs of various control units operate with the presence of the constant voltage produced by the PSU.

The image processing method according to the present embodiment discussed above can be provided in the form of computer program recorded in a computer-readable recording medium so as to be executed by a computer. A portion of the processing method can be provided on a network so that the method is implemented via a communications line.

Figure 11:
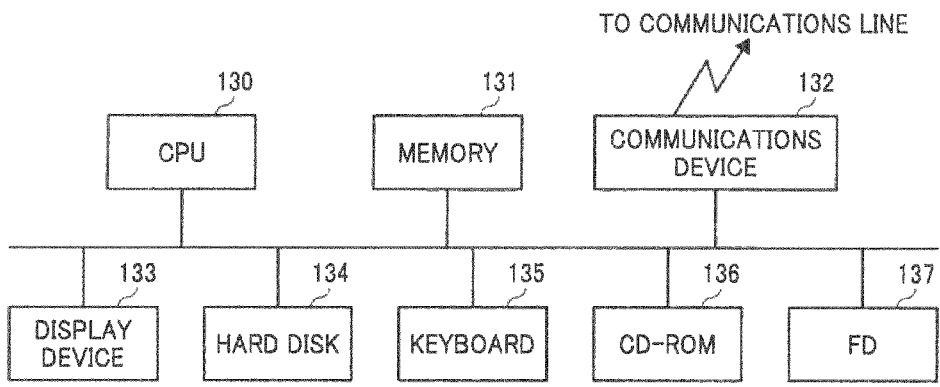
FIG. 11 is a block diagram illustrating an example configuration to be employed for causing control processing computer program according to the present embodiment to be executed by a computer.

More specifically, the processing method according to the present embodiment discussed above can be implemented by, as illustrated in FIG. 11, causing a computer (CPU 130), such as a personal computer or a workstation, to execute computer program provided in advance. The computer program can be executed by being recorded in a computer-readable recording medium, such as a memory 131, a hard disk 134, an FD 137, a CD-ROM 136, a magneto optical (MO), or a DVD, read out by the computer (CPU 130) from the recording medium, and displayed on a display device 133 as required in response to an operating input entered from a keyboard 135 or the like. Data about the processing method can be transmitted via a communications device 132 to an external device as required.

Figure 12:
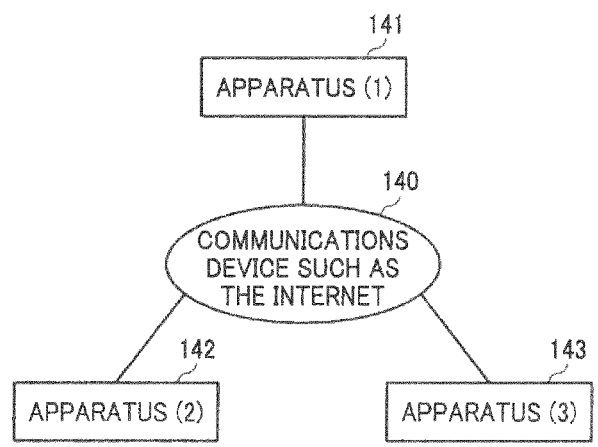
FIG. 12 is a block diagram illustrating an example configuration to be employed for causing the control processing computer program according to the present embodiment to be distributed via a computer network.

The computer program can be, as illustrated in FIG. 12, distributed to apparatuses 141 to 143, an example of which can be a personal computer, via a network 140 such as the Internet, by way of the recording medium.

The computer program can be provided as being preinstalled in, for instance, a hard disk that is an example of a built-in recording medium in a computer. The computer program can be provided by being temporarily or permanently stored in a recording medium that is assembled as a unit into a computer; alternatively, the computer program can be provided as a software package by utilizing the recording medium as a detachable recording medium.

Examples of the recording medium include an FD, a CD-ROM, an MO disk, a DVD, a magnetic disk, and a semiconductor memory.

The computer program can be configured so as to be transferred via a network, such as a LAN or the Internet, from a site for downloading in a wired or wireless manner to a computer and stored in a storage device, such as a hard disk, arranged in the computer.

According to an aspect of the present invention, first-code image data is combined with a document image, and further second-code image data serving as data for use in detecting modification is combined with the document image at an image area where the first-code image data is not provided. This is advantageous in providing a document image with which the two types of image data can be combined and which allows detection of modification made to the document image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image acquiring unit that acquires image data to be processed;
   an additional-data generating unit that generates additional data to be embedded in the image data;
   a first-code-image generating unit that generates, from the additional data, first-code image data that is machine readable;
   a first-superimposed-image producing unit that produces first-superimposed image data by combining the first-code image data with the image data;
   a detecting-data generating unit that generates detecting data to detect a modification made to the first-superimposed image data;
   a second-code-image generating unit that generates, from the detecting data, second-code image data that is machine readable; and
   a second-superimposed-image producing unit that produces second-superimposed image data by
   determining an area and a position associated with a portion of the second-code image data to be clipped based on combining position data in the second code image data,
   clipping the portion of the second-code image data, the portion of the second-code image data corresponding to an image area of the first-superimposed image data where the first-code image data is to be provided,
   determining that detecting data associated with the clipped portion of the second-code image data is restorable based on the area associated with the portion, and
   combining the first-superimposed image data with the second-code image data from which the portion has been clipped to produce the second-superimposed image data.

2. The image processing apparatus according to claim 1, wherein the first-code image data is representative of one of a one-dimensional bar-code and a two-dimensional bar-code.

3. The image processing apparatus according to claim 1, wherein the second-code image data is background-dot-pattern image data for the image data and has a same size as the first-superimposed image data.

4. The image processing apparatus according to claim 1, further comprising a printing unit that produces a printout of the second-superimposed image data on paper.

5. An image processing method comprising;
   acquiring image data to be processed;
   generating additional data to be embedded in the image data;
   generating, from the additional data, first-code image data that is machine readable;
   producing first-superimposed image data by combining the first-code image data with the image data;
   generating detecting data to detect a modification made to the first-superimposed image data;
   generating, from the detecting data, second-code image data that is machine readable; and
   producing second-superimposed image data, said producing the second-superimposed image data including:
   determining an area and a position associated with a portion of second-code image data to be clipped based on combining position data in the second code image data,
   clipping the portion of the second-code image data, the portion of the second-code image data corresponding to an image area of the first-superimposed image data where the first-code image data is to be provided,
   determining that detecting data associated with the clipped portion of the second-code image data is restorable based on the area associated with the portion, and
   combining the first-superimposed image data with the second-code image data from which the portion has been clipped to produce the second-superimposed image data.

6. A non-transitory computer-readable storage medium storing computer-readable instructions that, when executed by a computer, cause the computer to perform a method comprising:
   acquiring image data to be processed;
   generating additional data to be embedded in the image data;
   generating, from the additional data, first-code image data that is machine readable;
   producing first-superimposed image data by combining the first-code image data with the image data;
   generating detecting data to detect a modification made to the first-superimposed image data;
   generating, from the detecting data, second-code image data that is machine readable; and
   producing second-superimposed image data, said producing the second-superimposed image data including:
   determining an area and a position associated with second-code image data to be clipped based on combining position data in the second code image data,
   clipping a portion of the second-code image data, the portion of the second-code image data corresponding to an image area of the first-superimposed image data where the first-code image data is provided,
   determining that detecting data associated with the clipped portion of the second-code image data is restorable based on the area associated with the portion, and
   combining the first-superimposed image data with the second-code image data from which the portion has been clipped to produce the second-superimposed image data.

7. The image processing apparatus according to claim 1, wherein the detecting data is produced by a plurality of dot patterns, each dot pattern representing one of a Bit 0 and a Bit 1.

8. The image processing apparatus according to claim 1, wherein, in the second-superimposed image data, the image area of the first-superimposed image data is arranged where a first-code image associated with the first-code image data is superimposed with a cutout portion associated with the portion of the second-code image data.

9. The image processing apparatus according to claim 1, wherein the clipped portion of the second-code image data represents a percentage of a second-code image associated with the second-code image data, the percentage being equal to or less than a maximum percentage that allows restoration of corresponding detecting data.

10. The image processing apparatus according to claim 1, wherein the second-superimposed-image producing unit determines that detecting data associated with the portion of the second-code image data is restorable by calculating a percentage of the portion relative to a total second-code image area associated with the second-code image data.

11. The image processing apparatus according to claim 10, wherein the second-superimposed-image producing unit
determines whether the calculated percentage of the portion of the second-code image data is greater than a predetermined maximum value of area that allows restoration of corresponding detecting data,
when the portion of the second-code image data is not greater than the predetermined maximum value of area the corresponding detecting data is restorable, and
responsive to the corresponding detecting data being determined to be restorable, the second-superimposed-image producing unit produces the second-superimposed image data by the combining of the first-superimposed image data with the second-code image data from which the portion has been clipped.

12. The image processing apparatus according to claim 1, wherein the position of the clipped portion is at a corner of a second-code image associated with the second-code image data to clip.

13. The image processing method according to claim 5, wherein the position of the clipped portion is an undivided portion that exists only at a corner of a second-code image associated with the second-code image data to clip.

14. The image processing method according to claim 5, wherein said producing second-superimposed image data includes determining whether a calculated percentage of a total area of the image area is greater than a maximum value that allows restoration of corresponding detecting data.

15. The non-transitory computer-readable storage medium according to claim 6, wherein the position of the clipped portion is an undivided portion that exists only at a corner of a second-code image associated with the second-code image data to clip.

16. The non-transitory computer-readable storage medium according to claim 6, wherein said producing second-superimposed image data includes determining whether a calculated percentage of a total area of the image area is greater than a maximum value that allows restoration of corresponding detecting data, and if the calculated percentage is not greater than the maximum value, producing the second-superimposed image data.

\* \* \* \* \*